United States Patent
Kim et al.

(10) Patent No.: US 9,442,328 B2
(45) Date of Patent: Sep. 13, 2016

(54) DISPLAY DEVICE AND MANUFACTURING METHOD THEREOF

(71) Applicant: Samsung Display Co., Ltd., Yongin, Gyeonggi-do (KR)

(72) Inventors: Won Tae Kim, Suwon-si (KR); You Young Jin, Suwon-si (KR); Kyung Tae Chae, Hwaseong-si (KR); Don Chan Cho, Seongnam-si (KR); Seok-Joon Hong, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 117 days.

(21) Appl. No.: 14/152,653

(22) Filed: Jan. 10, 2014

(65) Prior Publication Data

US 2014/0375931 A1    Dec. 25, 2014

(30) Foreign Application Priority Data

Jun. 24, 2013  (KR) ........................ 10-2013-0072385

(51) Int. Cl.
  *G02F 1/1341*   (2006.01)
  *G02F 1/1343*   (2006.01)
  *G02F 1/1333*   (2006.01)

(52) U.S. Cl.
  CPC ....... *G02F 1/134309* (2013.01); *G02F 1/1341* (2013.01); *G02F 1/133377* (2013.01); *G02F 2001/134318* (2013.01); *G02F 2001/134345* (2013.01)

(58) Field of Classification Search
  None
  See application file for complete search history.

(56) References Cited

U.S. PATENT DOCUMENTS

| | | | |
|---|---|---|---|
| 2002/0167009 A1* | 11/2002 | Kim ................... | G02F 1/13458 257/72 |
| 2004/0121532 A1* | 6/2004 | Seo ................... | H01L 21/76202 438/232 |
| 2009/0059110 A1* | 3/2009 | Sasaki ............... | G02F 1/134363 349/39 |
| 2010/0127329 A1* | 5/2010 | Park ................... | H01L 27/1214 257/351 |
| 2012/0062448 A1* | 3/2012 | Kim .................. | G02F 1/133377 345/55 |
| 2014/0104532 A1 | 4/2014 | Cho et al. | |
| 2014/0152948 A1 | 6/2014 | Chae et al. | |
| 2014/0198284 A1* | 7/2014 | Weng ................. | G02F 1/13394 349/106 |

FOREIGN PATENT DOCUMENTS

KR   10-2014-0025739      3/2014

* cited by examiner

*Primary Examiner* — Dung Nguyen
*Assistant Examiner* — Shan Liu
(74) *Attorney, Agent, or Firm* — Innovation Counsel LLP

(57) ABSTRACT

A display device may include a substrate, a first roof layer formed of a material, a second roof layer formed of the material and spaced from the substrate, and a subpixel electrode disposed between the substrate and the first roof layer. The display device may further include a common electrode member disposed between the subpixel electrode and the first roof layer. The common electrode member may overlap the first roof layer in a first direction without extending beyond the first roof layer in a second direction. The first direction may be perpendicular to a surface of the substrate. The second direction may be parallel to the surface of the substrate. The display device may further include a liquid crystal set disposed between the subpixel electrode and the common electrode member.

8 Claims, 16 Drawing Sheets

DISPLAY DEVICE AND MANUFACTURING METHOD THEREOF

CROSS-REFERENCE TO RELATED APPLICATION

This application claims priority to and the benefit of Korean Patent Application No. 10-2013-0072385 filed in the Korean Intellectual Property Office on Jun. 24, 2013, the entire contents of which are incorporated herein by reference.

BACKGROUND (a) Technical Field

The present invention relates to a display device and a method for manufacturing the display device.

(b) Description of the Related Art

A typical liquid crystal display may include a thin film transistor panel, an opposite panel, and a liquid crystal layer disposed between the thin film transistor panel and the opposite panel. The thin film transistor panel and the opposite panel may include field generating electrodes. The liquid crystal display may generate an electric field in the liquid crystal layer by applying a voltage to the field generating electrodes to control alignment of liquid crystal molecules of the liquid crystal layer for controlling polarization of incident light, thereby controlling displayed images. Two substrates may be used for implementing the thin film transistor panel and the opposite panel. The two substrates may undesirably contribute to the thickness, the weight, the manufacturing cost, and/or the manufacturing time of the liquid crystal display.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a display device that includes only one substrate and may be related to a method for manufacturing the display device. Advantageously, a weight, a thickness, a cost, and/or a processing time associated with the display device may be minimized. In the display device, unwanted electrical connection (e.g., a short circuit between a pixel electrode and a common electrode) may be substantially prevented.

A embodiment of the present invention may be related to a display device that may include a substrate, a first roof layer formed of a first material, a second roof layer formed of the first material and spaced from the substrate, a first subpixel electrode disposed between the substrate and the first roof layer, and a second subpixel electrode disposed between the substrate and the second roof layer and aligned with the first subpixel electrode in a pixel column direction. The display device may further include a first common electrode member disposed between the first subpixel electrode and the first roof layer, the first common electrode member overlapping the first roof layer in a first direction without extending beyond the first roof layer in a second direction, the first direction being perpendicular to a surface (e.g., the bottom surface) of the substrate, the second direction being parallel to the surface of the substrate. The display device may further include a second common electrode member disposed between the second subpixel electrode and the second roof layer and electrically connected to the first common electrode member. The display device may further include a first liquid crystal set disposed between the first subpixel electrode and the first common electrode member. The display device may further include a second liquid crystal set disposed between the second subpixel electrode and the second common electrode member.

The first roof layer may be aligned with the second roof layer in the second direction.

A boundary of the first common electrode member may overlap a boundary of the first roof layer in the first direction.

A first portion of the first roof layer may overlap the first common electrode member. A second portion of the first roof member may not overlap the first common electrode member in the first direction and may be disposed between the second roof layer and the first portion of the first roof layer.

The display device may include an encapsulation layer that may overlap both the first roof layer and the second roof layer and configured to confine each of the first liquid crystal set and the second liquid crystal set. Two portions of the encapsulation layer may be positioned between the first roof layer and the second roof layer and may be positioned between the first liquid crystal set and the second liquid crystal set.

A first surface of the first common electrode member may be positioned between the first roof layer and a second surface of the first common electrode member. The first surface of the first common electrode member may be larger than the second surface of the first common electrode member.

The display device may include a first insulating layer disposed between the first common electrode member and the first roof layer. The first common electrode member may not extend beyond the first insulating layer in the second direction.

The display device may include a second insulating layer that may directly contact two surfaces of the first roof layer and may directly contact a portion of the first insulating layer. The portion of the first insulating layer may not overlap the first common electrode member in the first direction.

A first portion of the first roof layer may overlap the first insulating layer. A second portion of the first roof member may not overlap the first insulating layer in the first direction and may be disposed between the second roof layer and the first portion of the first roof layer. A first surface of the first insulating layer may directly contact the first roof layer. A second surface of the first insulating layer may contact the first common electrode member (which may be smaller than the first floor layer) and may be smaller than the first surface of the first insulating layer.

A portion of the second insulating layer may be disposed between the first roof layer and the second roof layer.

An embodiment of the present invention may be related to a method for manufacture a display device. The method may include the following steps: forming a first subpixel electrode and a second subpixel electrode on a substrate; forming a sacrificial layer on the first subpixel electrode and the second subpixel electrode; forming a common electrode material layer on the sacrificial layer; forming a first insulating material layer on the common electrode material layer; forming a first roof layer and a second roof layer on the first insulating material layer, the first roof layer and the second roof layer including a same organic material and being spaced from each other; etching the first insulating material layer using the first roof layer as a mask to form a first insulating layer; etching the common electrode material layer using the first roof layer and the second roof layer as shields to form a first common electrode member and a second common electrode member; removing the sacrificial layer to form a first cavity between the first subpixel electrode and the first common electrode member and to form a second cavity between the second subpixel electrode and the second common electrode member; providing a first liquid crystal set into the first cavity through a space between the first roof layer and the second roof layer; providing a second liquid crystal set into the second cavity through the space between the first roof layer and the second roof layer; and forming an encapsulation layer to confine each of the first liquid crystal set and the second liquid crystal set.

The step of etching the first insulating material layer may include dry-etching the first insulating material layer. The step of etching the common electrode material may include wet-etching the common electrode material.

The first common electrode member may overlap the first roof layer in a first direction without extending beyond the first roof layer in a second direction. The first direction may be perpendicular to a surface (e.g., the bottom surface) of the substrate. The second direction may be parallel to the surface of the substrate.

A first surface of the first common electrode member may be positioned between the first roof layer and a second surface of the first common electrode member. The first surface of the first common electrode member may be larger than the second surface of the first common electrode member.

The method may include the following step: before the step of forming the encapsulation layer, forming a second insulating layer on the first roof layer.

The method may include the following steps: after the step of etching the common electrode material layer, forming a second insulating material layer such that a first portion of the second insulating material layer is disposed on the first roof layer and that a second portion of the second insulating material layer is disposed on the sacrificial layer; and shielding the first portion of the second insulating material layer when removing the second portion of the second insulating material layer.

The method may include the following steps:

after the step of etching the common electrode material layer, forming a second insulating material layer such that a first portion of the second insulating material layer is disposed on the first roof layer and that a second portion of the second insulating material layer is disposed on the sacrificial layer; and removing the second portion of the second insulating material layer when performing the removing the sacrificial layer.

The step of removing the sacrificial layer may include ashing the sacrificial layer. At least one of an edge portion of the first common electrode member and an edge portion of the first insulating layer may be removed during the step of ashing the sacrificial layer.

The method may include the following step: after the step of ashing the sacrificial layer, forming a second insulating layer on the first roof layer.

The method may include the following step: forming a second insulating layer that directly contacts two surfaces of the first roof layer and directly contacts a portion of the first insulating layer.

A portion of the second insulating layer may be disposed between the first roof layer and the second roof layer. An embodiment of the present invention may be related to a display device that may include the following elements: a substrate including a plurality of pixel areas; a thin film transistor formed on the substrate; a first insulating layer formed on the thin film transistor; a pixel electrode connected with the thin film transistor and formed on the first insulating layer; a common electrode formed on the pixel electrode to be spaced apart from the pixel electrode with a microcavity therebetween; a second insulating layer formed on the common electrode; a roof layer formed on the second insulating layer; an injection hole formed in the common electrode, the second insulating layer, and the roof layer so as to expose a part of the microcavity; a liquid crystal layer filling the microcavity; and an encapsulation layer formed on the roof layer so as to cover the injection hole to seal the microcavity, in which a pattern of the common electrode is the same as the pattern of the roof layer or positioned on the inner side of the pattern of the roof layer The common electrode may have a reversely tapered shape.

A boundary, shape, and/or pattern of the second insulating layer may be the same as a boundary, shape, and/or pattern of the roof layer or positioned on the inner side of the boundary, shape, and/or pattern of the roof layer.

The second insulating layer may have a reversely tapered shape.

The second insulating layer may be made of at least one of silicon nitride, silicon oxide, and silicon oxynitride.

The display device may further include a third insulating layer formed on the roof layer.

A boundary, shape, and/or pattern of the common electrode may be positioned on the inner side of a boundary, shape, and/or pattern of the third insulating layer.

A boundary, shape, and/or pattern of the second insulating layer may be positioned on the inner side of a boundary, shape, and/or pattern of the third insulating layer.

The third insulating layer may be made of at least one of silicon nitride, silicon oxide, and silicon oxynitride.

An embodiment of the present invention may be related to a method for manufacturing a display device. The method may include the following steps: forming a thin film transistor on a substrate; forming a first insulating layer on the thin film transistor; forming a pixel electrode connected with the thin film transistor on the first insulating layer; forming a sacrificial layer on the pixel electrode; forming a common electrode on the sacrificial layer; forming a second insulating layer on the common electrode; forming a roof layer by coating and patterning an organic material on the second insulating layer; patterning the second insulating layer and the common electrode by using the roof layer as a mask; forming a microcavity between the pixel electrode and the common electrode by removing the sacrificial layer; forming a liquid crystal layer by injecting a liquid crystal material into the microcavity; and forming an encapsulation layer on the roof layer to seal the microcavity.

The patterning of the second insulating layer and the common electrode may include dry-etching the second insulating layer; and wet-drying the common electrode.

In the wet-etching of the common electrode, the pattern of the common electrode may be the same as the pattern of the roof layer or positioned on the inner side of the pattern of the roof layer, by over-etching the common electrode The common electrode may have a reversely tapered shape.

The second insulating layer may be made of at least one of silicon nitride, silicon oxide, and silicon oxynitride.

The method may include forming a third insulating layer on the roof layer.

The method may include removing a portion of the third insulating layer formed directly on the sacrificial layer by patterning the third insulating layer.

The method may include ashing the sacrificial layer after patterning the second insulating layer and the common electrode.

The third insulating layer may be formed after the step of ashing the sacrificial layer.

In the removing of the sacrificial layer, a portion of the third insulating layer positioned directly on the sacrificial layer may be lifted-off.

The third insulating layer may be made of at least one of silicon nitride, silicon oxide, and silicon oxynitride.

DETAILED DESCRIPTION OF THE EMBODIMENTS

Figure 1:
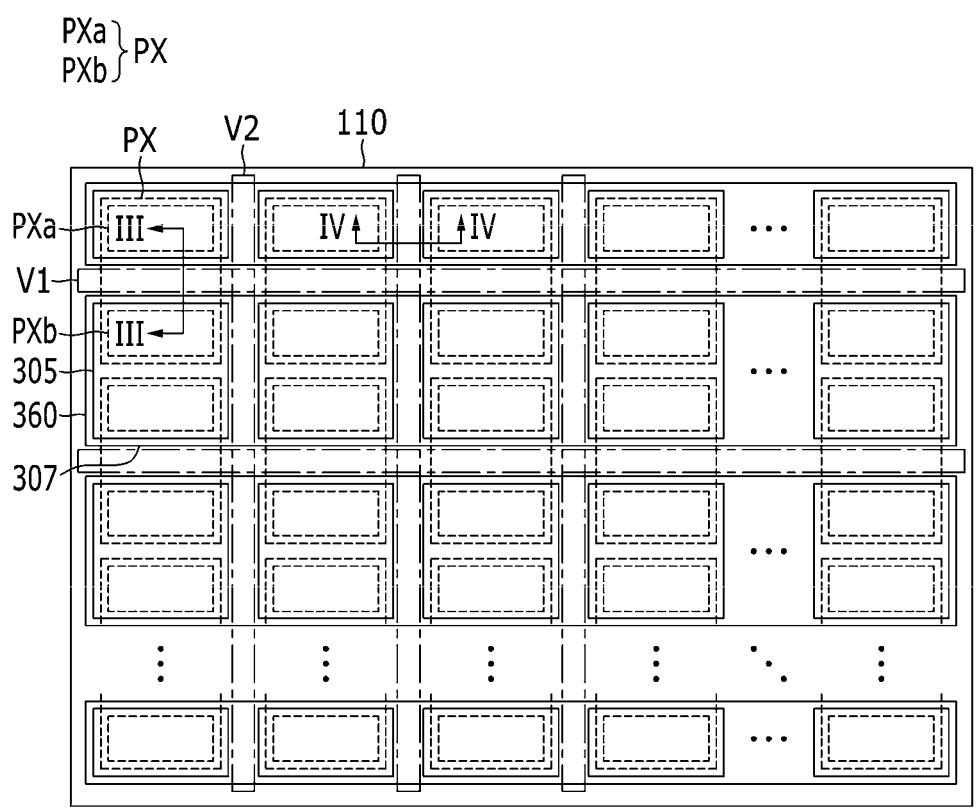
FIG. 1 is a plan view illustrating a display device according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, thicknesses of layers, films, panels, regions, etc., may be exaggerated for clarity. Like reference numerals may designate like elements in the specification. If an element, such as a layer, film, region, or substrate, is referred to as being "on" another element, it can be directly on the other element, or at least one intervening element may also be present. In contrast, if an element is referred to as being "directly on" another element, there are no intended intervening elements (except one or more environmental elements, such as air) present.

Although the terms "first", "second", etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively.

In the description, the term "connect" may mean "electrically connect"; the term "insulate" may mean "electrically insulate"

FIG. 1 is a plan view illustrating a display device (e.g., a liquid crystal display device) according to an embodiment of the present invention.

The display device may include a substrate 110 and a plurality of roof layers 360 formed on the substrate 110. The substrate may be made of at least one of glass and plastic.

The substrate 110 includes a plurality of pixel areas PX. The plurality of pixel areas PX may form a matrix that includes a plurality of pixel rows and a plurality of pixel columns. Each pixel area PX may include a first-type subpixel area PXa (or first subpixel area PXa, for conciseness) and a second-type subpixel area PXb (or second subpixel area PXb, for conciseness). The first subpixel area PXa and the second subpixel area PXb may be substantially vertically disposed and/or may be aligned in a pixel column direction.

A first-type valley V1 (or first valley V1, for conciseness) is positioned between the first subpixel area PXa and the second subpixel area PXb in a pixel row direction, and a second-type valley V2 (or second valley V2, for conciseness) is positioned between two immediately neighboring pixel columns.

A roof layer 360 is formed in a pixel row direction. In an embodiment, the first valley V1 may be positioned between two immediately neighboring roof layers 360 and thus may enable access through at least an injection hole 307 to at least a microcavity positioned below (and/or covered by) the roof layer 360 during manufacturing of the display device.

A roof layer 360 may be separated from the substrate 110 at a location between two adjacent second valleys V2, such that a microcavity 305 may be formed between the roof layer 360 and the substrate 110. The roof layer 360 may be attached to the substrate 110 at the two adjacent second valleys V2 to cover two sides of the microcavity 305.

In an embodiment, two or more of the roof layers 360 may be connected to each other at one or more first valleys V1. In an embodiment, a part of a roof layer 360 may be separated from the substrate 110 at a second valley V2, such that associated adjacent microcavities 305 may be connected to each other.

Figure 2:
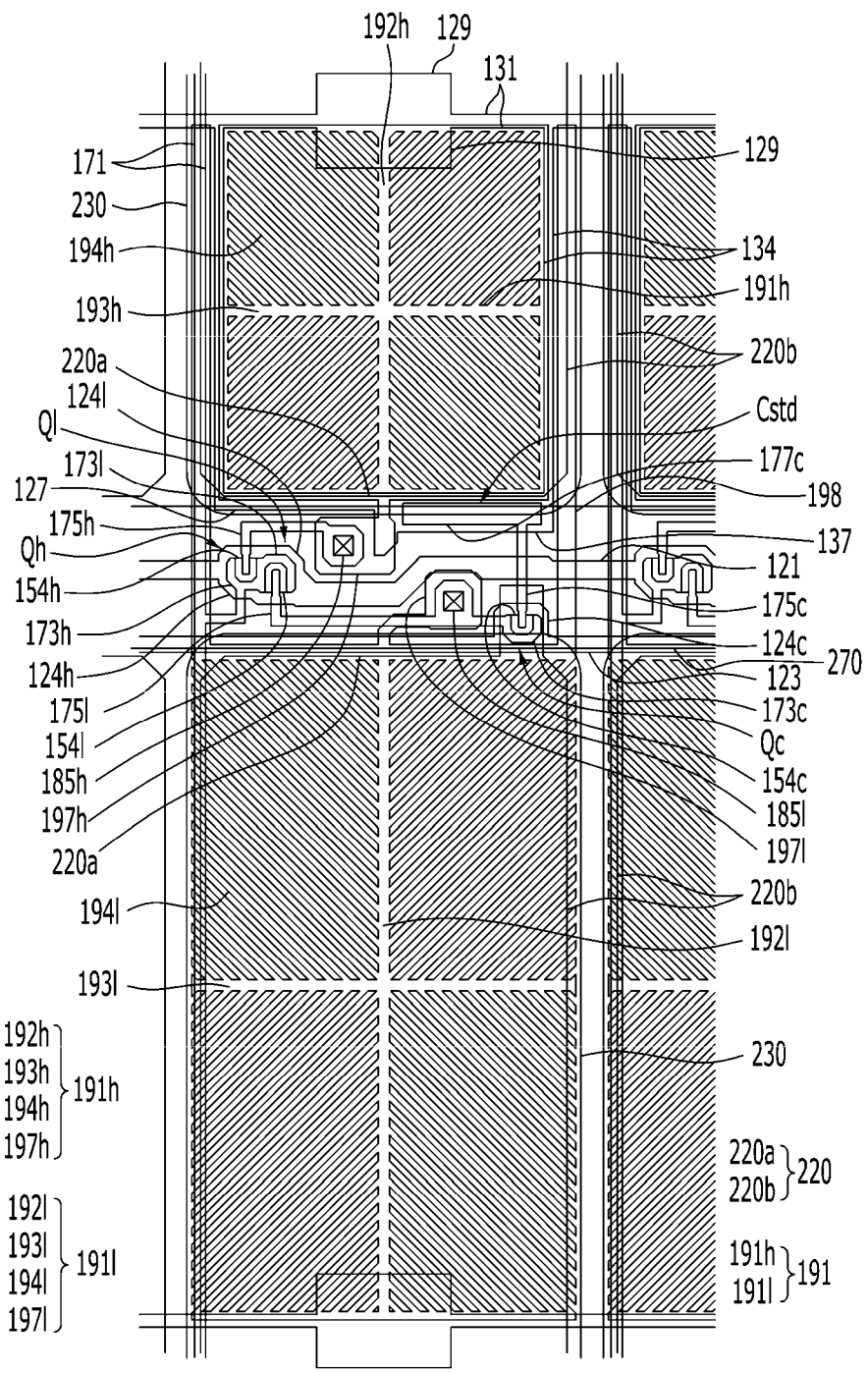
FIG. 2 is a plan view illustrating a pixel of a display device according to an embodiment of the present invention.
Figure 3:
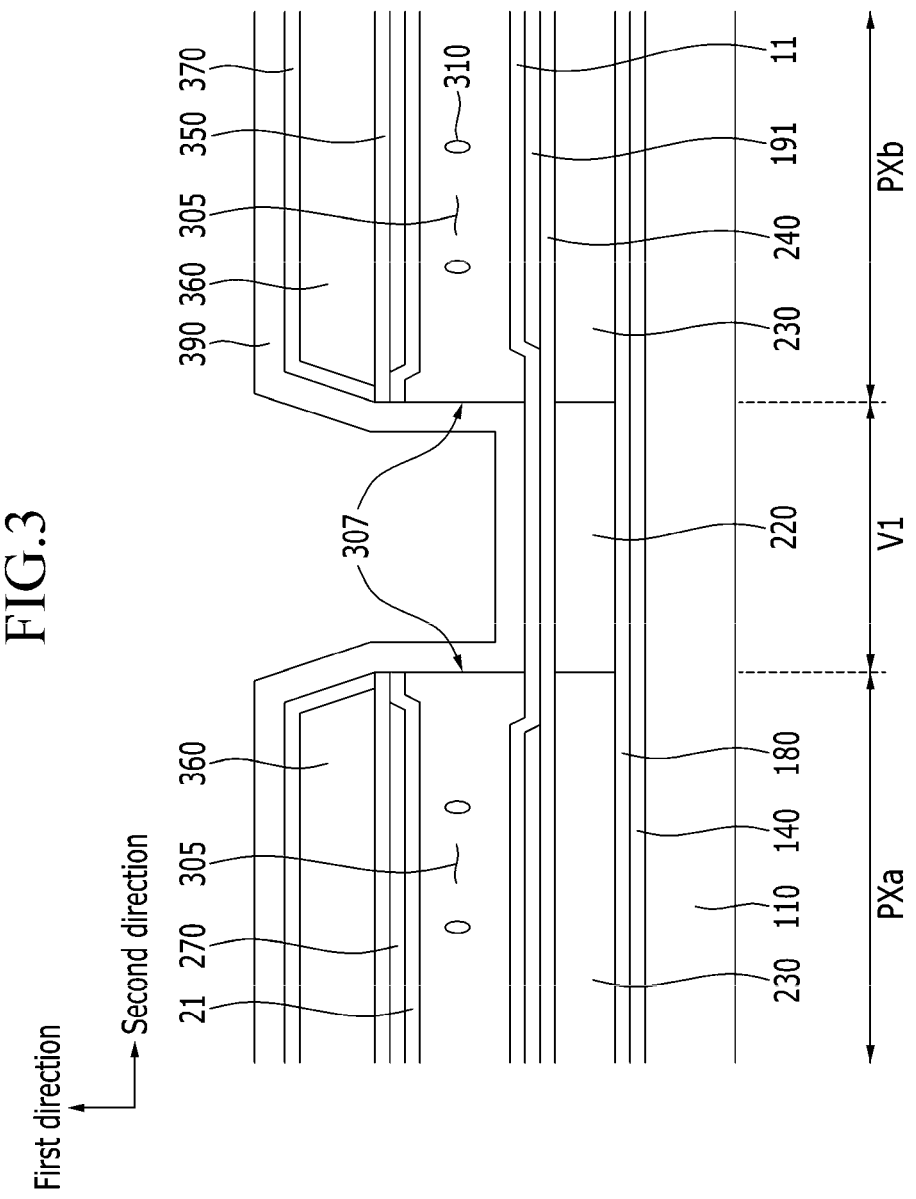
FIG. 3 is a cross-sectional view taken along line III-III indicated in FIG. 1 according to an embodiment of the present invention.
Figure 4:
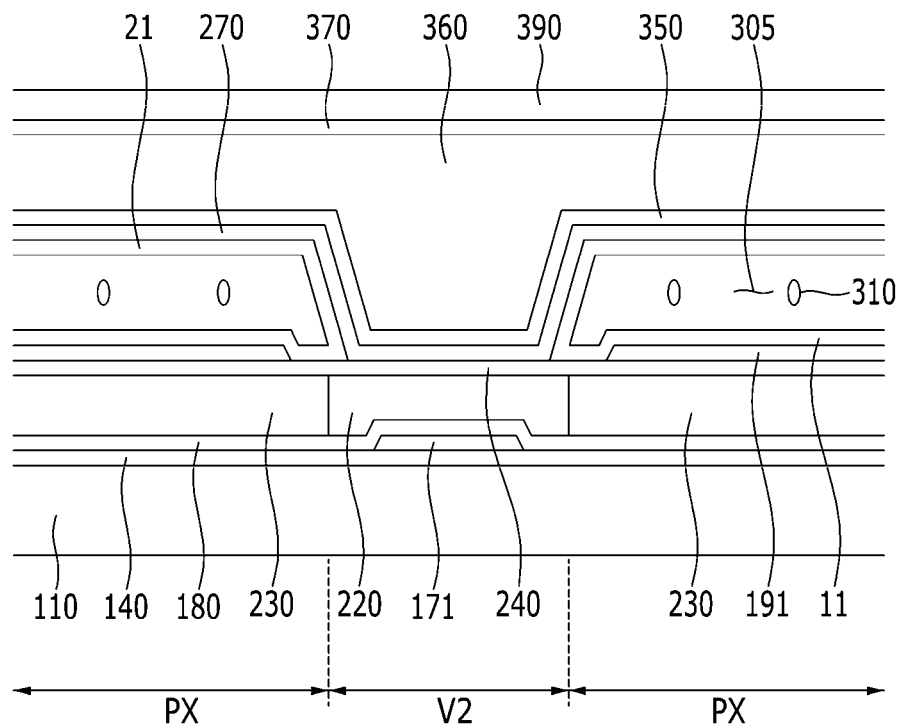
FIG. 4 is a cross-sectional view taken along line IV-IV indicated in FIG. 1 according to an embodiment of the present invention.
Figure 5:
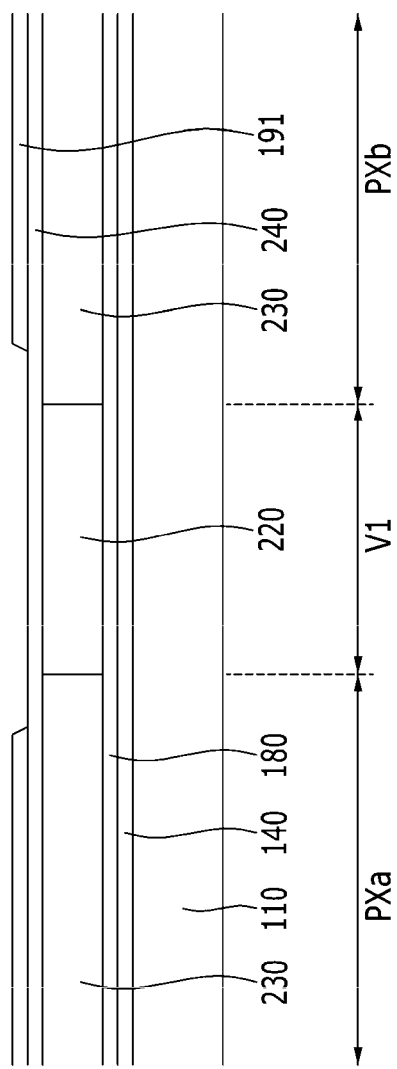
FIGS. 5 to 10 are process cross-sectional views illustrating a method for manufacturing a display device according to an embodiment of the present invention.

FIG. 2 is a plan view illustrating a pixel of the display device according to an embodiment of the present invention. FIG. 3 is a cross-sectional view taken along line III-III indicated in FIG. 1 according to an embodiment of the present invention. FIG. 4 is a cross-sectional view taken along line IV-IV indicated in FIG. 1 according to an embodiment of the present invention.

Referring to FIGS. 1 to 4, a pixel may be associated with a plurality of gate conductors, including a gate line 121, a step-down gate line 123, and a storage electrode line 131, which may be formed on the substrate 110.

The gate line 121 and the step-down gate line 123 may mainly extend in a horizontal direction (or pixel row direction parallel to a first valley V1) and may transfer gate signals. The gate conductors may include a first gate electrode 124*h* and a second gate electrode 124I that protrude substantially upward and downward, respectively, from the gate line 121. The gate conductors may include a third gate electrode 124c that protrudes upward from the step-down gate line 123. The first gate electrode 124h and the second gate electrode 124I are connected to and substantially aligned with each other in the pixel column direction and may form an enlarged portion of the gate line 121. The gate electrodes 124h, 124l, and 124c may have one or more other protrusion configurations.

The storage electrode line 131 mainly extends in a horizontal direction (e.g., the pixel row direction) and may transfer a predetermined voltage, such as a common voltage Vcom. The storage electrode line 131 includes storage electrodes 129 that protrude upward and downward, a pair of vertical portions 134 that extends toward the gate line 121 and extends substantially vertical to the gate line 121, and a horizontal portion 127 that connects ends of the vertical portions 134. The horizontal portion 127 includes a capacitor electrode 137 that expands toward the gate line 121.

A gate insulating layer 140 is formed on (and may cover) the gate conductors 121, 123, 124h, 124l, 124c, and 131. The gate insulating layer 140 may be made of an inorganic insulating material, such as at least one of silicon nitride (SiNx) and silicon oxide (SiOx). The gate insulating layer 140 may have a single layer structure or a multiple layer structure.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124I, and the third semiconductor 154c may be positioned on the third gate electrode 124c. The first semiconductor 154h and the second semiconductor 154l may be connected to each other, and the second semiconductor 154l and the third semiconductor 154c may be connected to each other. The first semiconductor 154h may be further formed under the data line 171. The semiconductors 154h, 154l, and 154c may be made of one or more of amorphous silicon, polycrystalline silicon, metal oxide, etc.

Ohmic contacts (not illustrated) may be formed on the semiconductors 154h, 154l, and 154c, respectively. The ohmic contacts may be made of silicide or a material (such as n+ hydrogenated amorphous silicon) in which an n-type impurity is doped at high concentration.

The pixel may be associated with a plurality of data conductors, including a data line 171, a first source electrode 173h, a second source electrode 173l, a third source electrode 173c, a first drain electrode 175h, a second drain electrode 175l, and a third drain electrode 175c. Some of the data conductors may be formed on the semiconductors 154h, 154l, and 154c.

The data line 171 may transfer a data signal. The data line 171 may mainly extend in a vertical direction (e.g., the pixel column direction) and may cross the gate line 121 and the step-down gate line 123. The data line 171 may include (or may be connected to) a first source electrode 173h and a second source electrode 173l, which extend toward (and/or correspond to) the first gate electrode 124h and the second gate electrode 124l, respectively, and are connected with each other.

Each of a first drain electrode 175h, a second drain electrode 175l, and a third drain electrode 175c may include a relatively wide portion and a relatively narrow rod-shaped portion. The rod-shaped portions of the first drain electrode 175h and the second drain electrode 175l are partially surrounded by the first source electrode 173h and the second source electrode 173l, respectively. The relatively wide portion of the second drain electrode 175l is connected to a third source electrode 173c, which has a 'U'-lettered shape. The relatively wide portion 177c of the third drain electrode 175c overlaps the capacitor electrode 137 to form a step-down capacitor Cstd, and the rod-shaped portion of the third drain electrode 175c is partially surrounded by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l. The third gate electrode 124c, the third source electrode 173c, and the third drain electrode 175c form a third thin film transistor Qc together with the third semiconductor 154c.

The first semiconductor 154h, the second semiconductor 154l, and the third semiconductor 154c are connected to each other. One or more of the semiconductors 154h, 154l, and 154c may have substantially the same planar shape as one or more of the data conductors 173h, 173l, 173c, 175h, 175l, and 175c and/or one or more of the associated ohmic contacts, except for one or more channel regions between one or more of the source electrodes 173h, 173l, and 173c and one or more of the drain electrodes 175h, 173l, and 175c.

In the first semiconductor 154h, an exposed portion that is not covered by the first source electrode 173h and the first drain electrode 175h is disposed between the first source electrode 173h and the first drain electrode 175h in a plan view of the display device. In the second semiconductor 154l, an exposed portion which is not covered by the second source electrode 173l and the second drain electrode 175l is disposed between the second source electrode 173l and the second drain electrode 175l in a plan view of the display device. In the third semiconductor 154c, an exposed portion that is not covered by the third source electrode 173c and the third drain electrode 175c is disposed between the third source electrode 173c and the third drain electrode 175c.

A passivation layer 180 is formed on the data conductors 171, 173h, 173l, 173c, 175h, 175l, and 175c and portions of the semiconductors 154h, 154l, and 154c exposed between the respective source electrodes 173h, 173l, and 173c and the respective drain electrodes 175h, 175l, and 175c. The passivation layer 180 may be made of an organic insulating material or an inorganic insulating material. The passivation layer 180 may have a single layer structure or a multiple layer structure.

A color filter 230 in each pixel area PX is formed on the passivation layer 180. The color filter 230 may display one of primary colors and/or may display white. In an embodiment, the primary colors may be three primary colors of red, green and blue. In an embodiment, the primary colors may include cyan, magenta, and yellow. In an embodiment, a color filter 230 may extend in a column direction along a space between immediately adjacent data lines 171.

A light blocking member 220 is formed in a region between immediately adjacent color filters 230 and/or between separated portions of color filters. The light blocking member 220 overlaps at least a boundary of the pixel area PX and the thin film transistors to prevent light leakage. A color filter 230 (or a portion of a color filter 230) is formed in each of the first subpixel area PXa and the second subpixel area PXb. A portion of the light blocking member 220 may be formed between the first subpixel area PXa and the second subpixel area PXb to cover the thin film transistors.

The light blocking member 220 includes a horizontal light blocking member 220a that extends along the gate line 121 and the step-down gate line 121 and covers the first thin film transistor Qh, the second thin film transistor Ql, and the third thin film transistor Qc. The light blocking member 220 further includes a vertical light blocking member 220b that extends along the data line 171. The horizontal light blocking member 220a may overlap a first valley V1, and the vertical light blocking member 220b may overlap a second valley V2. The color filter 230 and the light blocking member 220 may directly contact each other in a same layer of the display device and may both directly contact the passivation layer 180.

A first-type insulating layer 240 (or first insulating layer 240, for conciseness) may be formed on the color filter 230 and the light blocking member 220. The first insulating layer 240 may be made of an inorganic insulating material, such as at least one of silicon nitride (SiNx) and silicon oxide (SiOx). The first insulating layer 240 serves to protect the color filter 230 (which may be made of an organic material) and the light blocking member 220. In an embodiment, the first insulating layer 240 may be omitted.

In the first insulating layer 240, the light blocking member 220, and the passivation layer 180, a first contact hole 185h and a second contact hole 185l are formed.

A pixel electrode 191 is formed on the first insulating layer 240. The pixel electrode 191 may be made of a transparent metal material, such as at least one of indium tin oxide (ITO) and indium zinc oxide (IZO). The pixel electrode 191 may be connected to drain electrodes through the contact holes 185h and 185l.

The pixel electrode 191 includes a first-type subpixel electrode 191h (or first subpixel electrode 191h, for conciseness) and a second-type subpixel electrode 191l (or second subpixel electrode 191l), which are separated from each other with the gate line 121 and the step-down gate line 123 being disposed substantially between the subpixel electrodes 191h and 191l. The subpixel electrodes 191h and 191l may be substantially aligned each other in a column direction. The first subpixel electrode 191h and the second subpixel electrode 191l may be separated from each other with the first valley V1 being disposed therebetween in a plan view of the display device. The first subpixel electrode 191h is positioned in the first subpixel area PXa, and the second subpixel electrode 191l is positioned in the second subpixel area PXb.

The first subpixel electrode 191h and the second subpixel electrode 191l are connected to the first drain electrode 175h and the second drain electrode 175l through the first contact hole 185h and the second contact hole 185l, respectively. Accordingly, when the first thin film transistor Qh and the second thin film transistor Ql are turned on, the first subpixel electrode 191h and the second subpixel electrode 191l receive data voltages from the first drain electrode 175h and the second drain electrode 175l.

An overall shape of the first subpixel electrode 191h and the second subpixel electrode 191l may be substantially a quadrangle. The first subpixel electrode 191h and the second subpixel electrode 191l include cross stems. The cross stems include horizontal 193h and 193l and vertical stems 192h and 192l that cross the horizontal stems 193h and 193l, respectively. The first subpixel electrode 191h and the second subpixel electrode 191l may include a plurality of minute branches 194h and 194l and may include protrusions 197h and 197l protruding downward or upward from edge sides of the subpixel electrodes 194h and 194l, respectively.

Each of the subpixel electrodes 191h and 191l of the pixel electrode 191 is divided into four sub-regions by an associated one of the horizontal stems 193h and 193l and an associated one of the vertical stems 192h and 192l. The minute branches 194h and 194l obliquely extend from the horizontal stems 193h and 193l and the vertical stems 192h and 192l, extending at an angle of approximately 45 degrees or 135 degrees with respect to the gate line 121 or the horizontal stems 193h and 193l. In an embodiment, directions in which the minute branches 194h and 194l of the two adjacent sub-regions extend may be perpendicular to each other.

In an embodiment, the first subpixel electrode 191h may include an outer stem that surrounds at least some elements of the first subpixel electrode 191h. The second subpixel electrode 191l may include horizontal portions positioned at an upper end and a lower end of the second subpixel electrode 191l. The pixel electrode 191 may include left and right vertical portions 198 positioned at the left and the right of the first subpixel electrode 191h. The left and right vertical portions 198 may prevent capacitive coupling between the data line 171 and the first subpixel electrode 191h.

The layout shape of the pixel area, the structure of the thin film transistor, and the shape of the pixel electrode described above are examples and may be modified in various embodiments.

A common electrode 270 may overlap the pixel electrode 191 and may be spaced from the pixel electrode 191 at a predetermined distance. A microcavity 305 is formed between the pixel electrode 191 and the common electrode 270. The microcavity 305 may be substantially surrounded by at least one of the pixel electrode 191 and the common electrode 270. A width and an area of the microcavity 305 may be configured according to a size and resolution of the display device.

The common electrode 270 may be made of a transparent metal material, such as at least one of indium tin oxide (ITO) and indium zinc oxide (IZO). A predetermined voltage may be applied to the common electrode 270, and an electric field may be generated between the pixel electrode 191 and the common electrode 270.

A first-type alignment layer 11 (or first alignment layer 11, for conciseness) is formed on the pixel electrode 191. The first alignment layer 11 may also be formed directly on a portion of the first insulating layer 240 that is not covered by the pixel electrode 191. In an embodiment, an insulating layer 250 (illustrated in FIG. 4) may be implemented between the first alignment layer 11 and the pixel electrode 191.

A second-type alignment layer 21 (or second alignment layer 21, for conciseness) is formed on the common electrode 270. The second alignment layer 21 is disposed between the common electrode 270 and the first alignment layer 11.

The first alignment layer 11 and the second alignment layer 21 may be vertical alignment layers and may be made of alignment materials, such as at least one of polyamic acid, polysiloxane, and polyimide. The alignment layers 11 and 21 may be connected to each other at an edge of the pixel area PX.

A liquid crystal layer may include liquid crystal molecules 310 and may be formed in the microcavity 305 positioned between the pixel electrode 191 and the common electrode 270. The liquid crystal molecules 310 may have negative dielectric anisotropy and may be oriented in a vertical direction that is substantially perpendicular to the substrate 110 when no electric field is applied to the pixel electrode 191.

The first subpixel electrode 191*h* and the second subpixel electrode 191*l* to which the data voltage is applied generate an electric field together with a common electrode 270 to determine directions of the liquid crystal molecules 310. The luminance of light that is transmitted through the liquid crystal layer may be substantially determined by the directions (or orientations) of the liquid crystal molecules 310.

A second-type insulating layer 350 (or second insulating layer 350, for conciseness) may be formed on the common electrode 270. The second insulating layer 350 may be made of an inorganic insulating material, such as at least one of silicon nitride (SiNx), silicon oxide (SiOx), and silicon oxynitride (SiOxNy). In an embodiment, the third insulating layer may be omitted.

A roof layer 360 is formed on the second insulating layer 350. The roof layer 360 may be made of an organic material. A microcavity 305 is formed below the roof layer 360, and the shape of the microcavity 305 may be maintained by hardening the roof layer 360 through a curing process. The microcavity 305 may be positioned between the roof layer 360 and the pixel electrode 191.

A roof layer 360 is formed in each pixel area PX along a pixel row and a second valley V2, and is not formed in a first valley V1. That is, the roof layer 360 is not formed between a first subpixel area PXa and a second subpixel area PXb. A microcavity 305 is formed below each roof layer 360 in each of the first subpixel area PXa and the second subpixel area PXb. In the second valley V2, a portion of a roof layer 360 may be disposed between two microcavities 305. A thickness of the portion of the roof layer 360 positioned at the second valley V2 may be larger than a thickness of another portion of the roof layer 360 positioned in each of the first subpixel area PXa and the second subpixel area PXb. An upper surface and sides of the microcavity 305 may be covered by the roof layer 360.

An injection hole 307 for exposing a part of (and/or for access to) the microcavity 305 is formed in at least one of the common electrode 270, the second insulating layer 350, and the roof layer 360. Injection holes 307 may face each other at edges of the first subpixel area PXa and the second subpixel area PXb. In an embodiment, a first injection holes 307 may correspond to a lower side of the first subpixel area PXa to allow access to a first microcavity 305 that overlaps the first subpixel electrode 191*h*, and a second injection hole 307 may correspond to an upper side of the second subpixel area PXb to allow access to a second microcavity 305 that overlaps the second pixel electrode 191*l*. An aligning agent or a liquid crystal material may be injected into a microcavity 305 through a corresponding injection hole 307.

The common electrode 270, the second insulating layer 350, and the roof layer(s) 360 may have similar shapes or similar patterns in some areas in a plan view of the display device. The shape (or pattern) of the common electrode 270, the shape (or pattern) of the second insulating layer 350, and the shape (or pattern) of a roof layer 360 may be different from each other near the injection holes 307.

A boundary of the common electrode 270 may be the same as (or overlap) a boundary of a roof layer 360 or may be positioned on the inner side of the boundary of a roof layer 360 (in a plan view of the display device), without protruding beyond the roof layer 360. In an embodiment, an edge line of a roof layer 360 may overlap an edge line of the common electrode 270. In an embodiment, an edge line of a roof layer 360 may be positioned between an edge line of the common electrode 270 and an edge line of an associated injection hole 307 in a plan view of the display device, wherein the associated injection hole 307 is configured to allow access to an associated microcavity 305, and wherein the common electrode 270 is positioned between the associated microcavity 305 and the roof layer 360. That is, an edge portion of the roof layer 360 may not overlap the common electrode 270. In an embodiment, the edge portion of the roof layer may have a tapered shape with an edge surface (or side surface) extending in a first direction, and an edge portion of the common electrode 270 may have a reversely-tapered shape with an edge surface (or side surface) extending in a second direction that is different from the first direction. A first surface (e.g., top side surface) of the roof layer 360, a second surface (e.g., bottom side surface) of the roof layer 360, a first surface (e.g., top side surface) of the common electrode 270, and a second surface (e.g., bottom side surface) of the common electrode 270 may overlap each other. The second surface of the roof layer 360 and the first surface of the common electrode 270 may be disposed between the first surface of the roof layer 360 and the second surface of the common electrode 270. The first surface of the roof layer 360 may be smaller than the second surface of the roof layer 360. The first surface of the common electrode 270 may be larger than the second surface of the common electrode 270. The larger first surface of the common electrode 270 may enable the common electrode 270 securely attach to the second insulating layer 350. The smaller second surface of the common electrode 270 may prevent unwanted electrical connection. Advantageously, the common electrode 270 may be satisfactorily insulated and stably positioned, and unwanted electrical connection between the common electrode 270 and other conductive elements (e.g., a pixel electrode 191) may be prevented.

A boundary of the second insulating layer 350 may be the same as (or overlap) a boundary of the roof layer 360 or may be positioned on the outer side of the boundary of the roof layer 360 (in a plan view of the display device).

In an embodiment, a boundary of the second insulating layer 350 may be formed on the inner side of a boundary of the roof layer 360. An edge portion of the second insulating layer 350 that is associated with the boundary of the second insulating layer 350 may have a reversely-tapered shape that has a relatively larger top side surface and a relatively smaller bottom side surface.

A third-type insulating layer 370 (or third insulating layer 370, for conciseness) may be formed on the roof layer 360. The third insulating layer 370 may be made of an inorganic insulating material, such as at least one of silicon nitride (SiNx), silicon oxide (SiOx), and silicon oxynitride (SiOxNy). The third insulating layer 370 may cover an upper surface (or top side surface) and a side (or edge side surface disposed at an angle with respect to the top side surface) of the roof layer 360. The third insulating layer 370 may protect the roof layer 360, which may be made of an organic material.

A boundary of the fourth insulating layer 370 may overlap at least one of a boundary of the common electrode 270, a boundary of the second insulating layer 350, and a boundary of the roof layer 360 (in a plan view of the display device). A boundary of the third insulating layer 370 may be different from or may not overlap boundaries of the common electrode 270, the second insulating layer 350, and the roof layer 360 near the injection hole 307 (in a plan view of the display device).

A boundary of the common electrode 270 may be positioned on the inner side of a boundary of the third insulating layer 370 (in a plan view of the display device). The common electrode 270 may be smaller than the third insulating layer 370 in a plan view of the display device.

A boundary of the second insulating layer 350 may be the same as (or overlap) a boundary of the third insulating layer 370 (in a plan view of the display device).

In an embodiment, a boundary of the second insulating layer 350 may be formed on the inner side of a boundary of the roof layer 360 (in a plan view of the display device). The second insulating layer 350 may be smaller than the roof layer 360 in a plan view of the display device.

The third insulating layer 370 may contact the second insulating layer 350. Therefore, the roof layer 360 may be substantially enclosed by the third insulating layer 370 and the second insulating layer 350.

In an embodiment, the third insulating layer 370 may be omitted.

An encapsulation layer 390 may be formed on and/or may overlap at least one of the third insulating layer 370, the roof layer 360, the second insulating layer 350, and the common electrode 270. The encapsulation layer 390 may cover the injection hole 307, which may allow access to the associated microcavity 305. The encapsulation layer 390 may seal the microcavity 305 so that the liquid crystal molecules 310 formed in the microcavity 305 are not discharged outside. The encapsulation layer 390 may directly contact the liquid crystal molecules 310 and may be made of a material that does not substantially react (e.g., chemically react) with liquid crystal molecules 310. In an embodiment, the encapsulation layer 390 may have a layer that is made of parylene.

The encapsulation layer 390 may have a multilayer structure, such as a double layer structure or a triple layer structure. The double layer structure may include two layers made of different materials. The triple layer structure may include three layers, and materials of immediately adjacent layers are different from each other. For example, the encapsulation layer 390 may include a layer made of an organic insulating material and a layer made of an inorganic insulating material.

Although not illustrated, polarizers may be formed on upper and lower sides of the display device. The polarizers may include a first polarizer and a second polarizer. The first polarizer may be attached onto the lower side of the substrate 110, and the second polarizer may be attached onto the encapsulation layer 390.

FIGS. 5 to 10 are process cross-sectional views illustrating a method for manufacturing a display device (e.g., the display device describe with reference to FIGS. 1 to 4) according to an embodiment of the present invention.

A gate line 121 and a step-down gate line 123 (both extending in one direction) are formed on a substrate 110, which may be made of glass, plastic, etc. Substantially simultaneously, a first gate electrode 124$h$, a second gate electrode 124$l$, and a third gate electrode 124$c$, which protrude from the gate line 121, are formed.

Substantially simultaneously, a storage electrode line 131 may be formed. The storage electrode line 131 may be spaced apart from the gate line 121, the step-down gate line 123, and the gate electrodes 124$h$, 124$l$, and 124$c$.

Subsequently, a gate insulating layer 140 is formed on the entire surface of the substrate 110 and may cover the gate line 121, the step-down gate line 123, the gate electrodes 124$h$, 124$l$, and 124$c$, and the storage electrode line 131. The gate insulating layer 140 may be formed of an inorganic insulating material, such as silicon oxide (SiOx) or silicon nitride (SiNx). The gate insulating layer 140 may have a single layer structure or a multiple layer structure.

Subsequently, a first semiconductor 154$h$, a second semiconductor 154$l$, and a third semiconductor 154$c$ are formed by depositing a semiconductor material (such as at least one of amorphous silicon, polycrystalline silicon, and metal oxide) on the gate insulating layer 140 and then patterning the deposited semiconductor material. The first semiconductor 154$h$ may be positioned on the first gate electrode 124$h$, the second semiconductor 154$l$ may be positioned on the second gate electrode 124I, and the third semiconductor 154$c$ may be positioned on the third gate electrode 124$c$.

Subsequently, a data line 171, which extends in the other direction, is formed by depositing a metal material and then patterning the deposited metal material. The metal material may have a single layer structure or a multiple layer structure.

Substantially simultaneously, a first source electrode 173$h$, with protrudes from the data line 171 above the first gate electrode 124$h$, and a first drain electrode 175$h$, which is spaced apart from the first source electrode 173$h$, are formed. Substantially simultaneously, a second source electrode 173$l$, which is connected to the first source electrode 173$h$, and a second drain electrode 175$l$, which is spaced apart from the second source electrode 173$l$, are formed. Substantially simultaneously, a third source electrode 173$c$, which extends from the second drain electrode 175$l$, and a third drain electrode 175$c$, which is spaced apart from the third source electrode 173$c$, are formed.

The semiconductors 154$h$, 154$l$, and 154$c$, the data line 171, the source electrodes 173$h$, 173$l$, and 173$c$, and the drain electrodes 175$h$, 175$l$, and 175$c$ may be formed by sequentially depositing a semiconductor material and a metal material and then patterning the semiconductor material and the metal material in a same patterning process. In an embodiment, the first semiconductor 154$h$ may overlap a portion of the data line 171.

The gate electrodes 124$h$, 124$l$, and 124$c$, the source electrodes 173$h$, 173l, and 173$c$, and the drain electrodes 175$h$, 175l, and 175$c$ form thin film transistors (TFTs) Qh, Ql, and Qc together with the semiconductors 154$h$, 154$l$, and 154$c$, respectively.

Subsequently, a passivation layer 180 is formed on the data line 171, the source electrodes 173$h$, 173l, and 173$c$, the drain electrodes 175$h$, 175l, and 175$c$, and the semiconductors 154$h$, 154$l$, and 154$c$ exposed between the respective source electrodes 173$h$, 173$l$, and 173$c$ and the respective drain electrodes 175$h$, 175l, and 175$c$. The passivation layer 180 may be made of an organic insulating material and/or an inorganic insulating material. The passivation layer 180 may have a single layer structure or a multiple layer structure.

Subsequently, a color filter 230 is formed in each pixel area PX on the passivation layer 180. A color filter 230 or a portion of a color filter 230 is formed in each of the first subpixel area PXa and the second subpixel area PXb. No color filter may be formed at the first valley V1. Color filters 230 having the same color may be formed in a column direction in columns of the plurality of pixel areas PX. For forming color filters 230 having three colors, a first colored color filter 230 may be first formed and then a second colored color filter 230 may be formed by shifting a mask. Subsequently, the second colored color filter 230 may be formed and then a third colored color filter may be formed by shifting a mask.

Subsequently, a light blocking member 220 is formed on a boundary of each pixel area PX and may be formed on the passivation layer 180 and the thin film transistors. The light blocking member 220 may also be formed at the first valley V1 positioned between the first subpixel area PXa and the second subpixel area PXb.

The light blocking member 220 may be formed at one or more edges of each pixel area PX. The light blocking member 220 may overlap a support member 365 that is subsequently formed.

In an embodiment, the light blocking member 220 is formed after the color filters 230 have been formed. In an embodiment, the light blocking member 220 may be formed before formation of the color filters 230.

Subsequently, a first insulating layer 240, which may be made of an inorganic insulating material such as at least one of silicon nitride (SiNx), silicon oxide (SiOx), and silicon oxynitride (SiOxNy), is formed on the color filter 230 and the light blocking member 220.

Subsequently, a first contact hole 185h is formed by etching the passivation layer 180, the first light blocking member 220, and the first insulating layer 240 so as to expose a part of the first drain electrode 175h, and a second contact hole 185l is formed so as to expose a part of the second drain electrode 175l.

Subsequently, a first subpixel electrode 191h is formed in the first subpixel area PXa, and a second subpixel electrode 191l is formed in the second subpixel area PXb, by depositing and patterning a transparent metal material, such as at least one of indium tin oxide (ITO) and indium zinc oxide (IZO), on the first-type insulating layer 240. The first subpixel electrode 191h and the second subpixel electrode 191l are separated from each other with the first valley V1 being positioned therebetween. The first subpixel electrode 191h is connected to the first drain electrode 175h through the first contact hole 185h, and the second subpixel electrode 191l is connected to the second drain electrode 175l through the second contact hole 185l.

Horizontal stems 193h and 193l and vertical stems 192h and 192l crossing the horizontal stems 193h and 193l are formed in the first subpixel electrode 191h and the second subpixel electrode 191l. Further, a plurality of minute branches 194h and 194l, which obliquely extend from the horizontal stems 193h and 193l and the vertical stems 192h and 192l, is formed.

Figure 6:
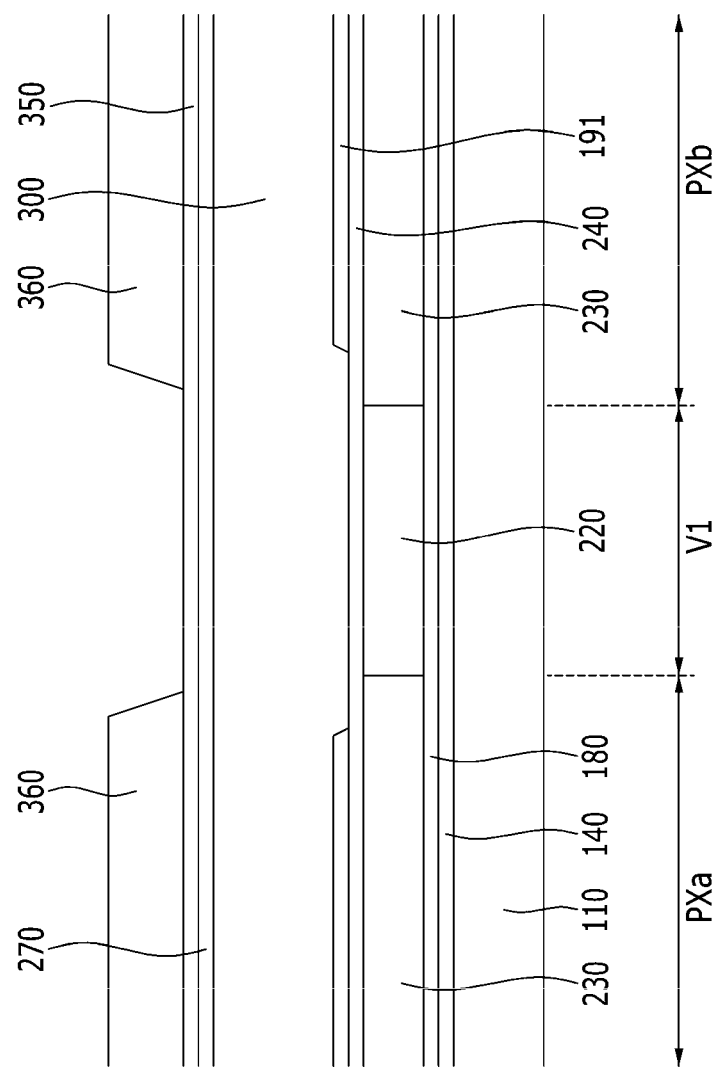

Referring to FIG. 6, a sacrificial layer 300 may be formed by coating a photosensitive organic material on the pixel electrode 191 and performing a photolithography process.

Sacrificial layers 300 may be formed along the plurality of pixel columns. A sacrificial layer 300 may cover a pixel area PX and may cover the first valley V1 positioned between the first subpixel area PXa and the second subpixel area PXb of the pixel area PX.

A common electrode 270 material layer may be formed by depositing a transparent metal material, such as at least one of indium tin oxide (ITO) and indium zinc oxide (IZO), on the sacrificial layer 300.

Subsequently, a second insulating layer 350 material layer may be formed on the common electrode 270 material layer using an inorganic insulating material, such as at least one of silicon nitride (SiNx), silicon oxide (SiOx), and silicon oxynitride (SiOxNy).

Subsequently, a roof layer 360 may be formed by coating and patterning an organic material on the second insulating layer 350 material layer. A portion of the organic material positioned at the first valley V1 may be removed. As a result, the roof layers 360 may be formed along a plurality of pixel rows.

Figure 7:
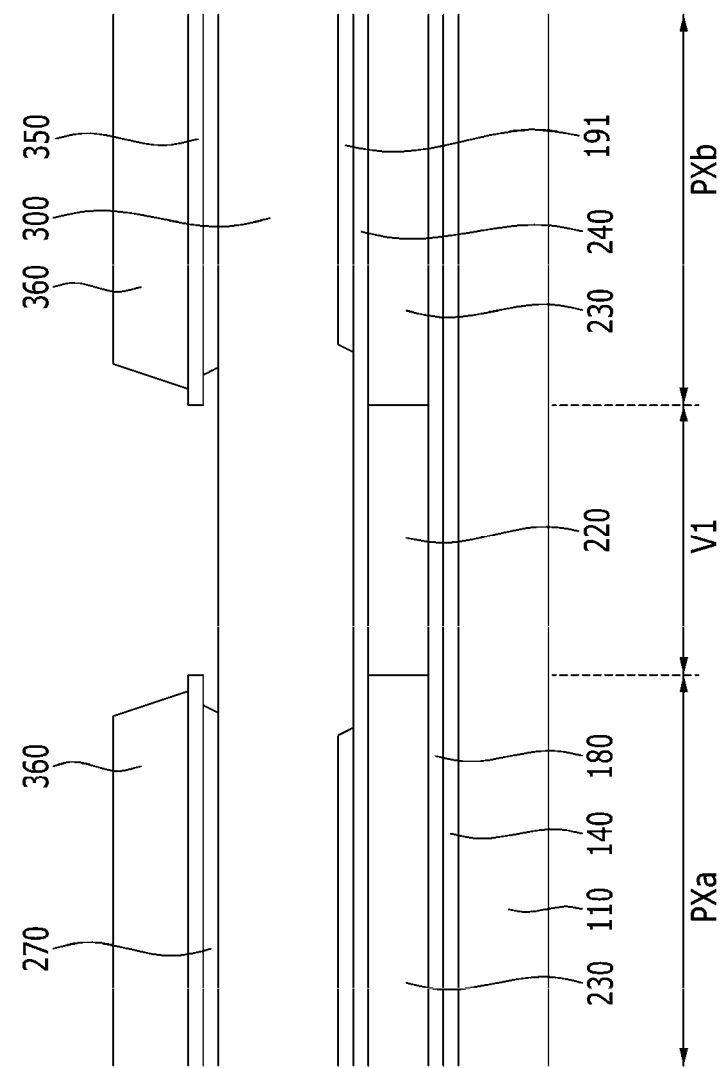

Referring to FIG. 7, the second insulating layer 350 material layer and the common electrode 270 material layer may be patterned using the roof layer 360 as a mask. In an embodiment, the second insulating layer 350 material layer may be dry-etched using the roof layer 360 as a mask, and subsequently the common electrode 270 material layer may be wet-etched using the roof layer 360 and/or the remaining second insulating layer 350 material layer as a mask.

In the wet-etching process of forming the common electrode 270, the common electrode 270 material layer may be over-etched. As a result, the shape of the top side of the common electrode 270 may be the same as the shape of the bottom side of the roof layer 360, or the shape of the common electrode 270 may be positioned on the inner side of the shape of the roof layer 360 in a plan view of the display device. The etched edge portion of the common electrode 270 may have a reversely-tapered shape.

In an embodiment, as illustrated in FIG. 7, the second insulating layer 350 may protrude beyond the roof layer 360. Advantageously, a subsequently formed third insulating layer 370 may be securely combined with the second insulating layer 350 to securely enclose and protect the roof layer 360.

In an embodiment, the second insulating layer 350 may be over-etched. As a result, an etched boundary of the second insulating layer 350 may be the same as (or overlap) a patterned edge of the roof layer 360 or may be positioned on the inner side of the pattern of the roof layer 360, such that the second insulating layer 350 does not protrude beyond the roof layer 360. Advantageously, the second insulating layer 350 may not substantially interfere with liquid crystal material or a device in a process of providing the liquid crystal material to a microcavity 305. In an embodiment, an etched edge portion of the second insulating layer 350 may have reversely-tapered shape.

Figure 8:
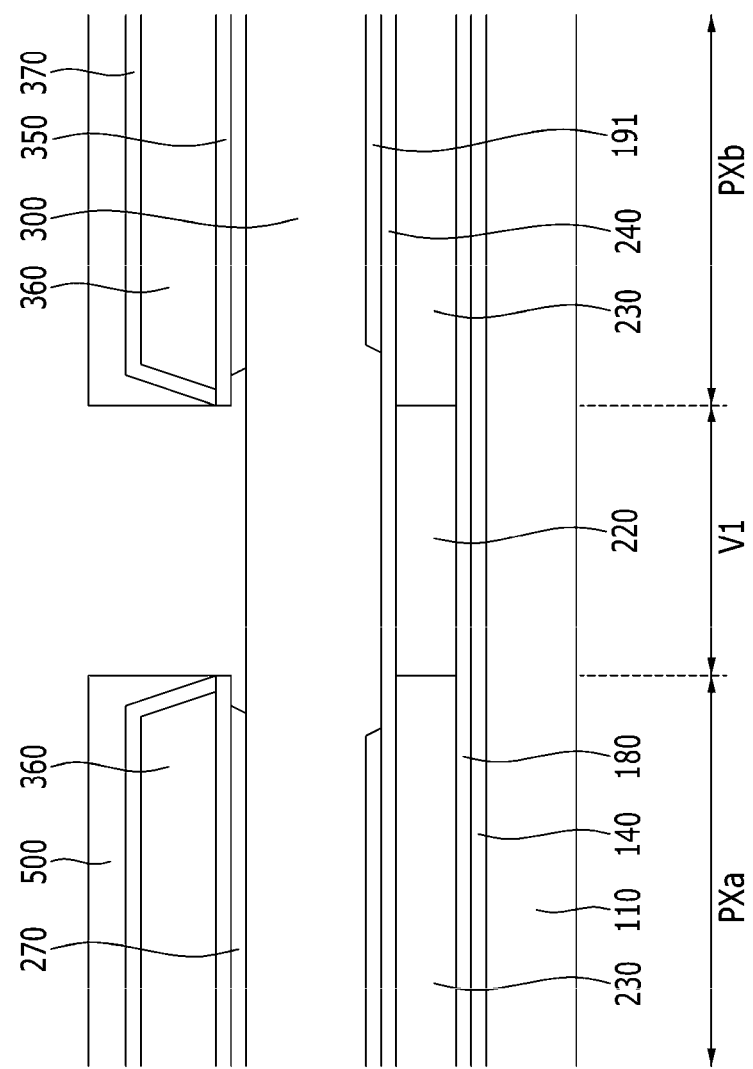

Referring to FIG. 8, a third insulating layer 370 material layer made of an inorganic insulating material, such as at least one of silicon nitride (SiNx), silicon oxide (SiOx), and silicon oxynitride (SiOxNy), may be formed on the roof layer 360.

Subsequently, a photoresist 500 material layer may be coated on the third insulating layer 370 and may be patterned by a photolithography process. A portion of the photoresist 500 material layer positioned at the first valley V1 may be removed, and a patterned photoresist 500 may remain on the third insulating layer 370 material layer. The third insulating layer 370 material layer may be etched using the patterned photoresist 500 as a mask. A portion of the third insulating layer 370 material layer positioned at the first valley V1 may be removed, and the resulted third insulating layer 370 may remain on the roof layer 360.

The third insulating layer 370 may cover the upper surface and one or two side surfaces of the roof layer 360 to protect the roof layer 360. A boundary of the third insulating layer 370 may be positioned beyond a boundary of the roof layer 360 (in a plan view of the display device). The third insulating 370 may extend and/or protrude beyond the roof layer 360. An edge portion of the third insulating layer 370 does not overlap the roof layer 360 in a direction perpendicular to the substrate 110.

Portions of two immediately neighboring third insulating layers 370 may be positioned between two immediately neighboring roof layers 360. A portion of a first third-type insulating layer 370 and a portion of a second third-type insulating layer 370 that immediately neighbors the first third-type insulating layer 370 may be positioned between a first roof layer 360 and a second roof layer 360 that immediately neighbors the first roof layer 360.

The common electrode 270 material layer may be over-etched using the roof layer 360 as a mask to produce the common electrode 270. As a result, the common electrode 270 may be completely covered by the third insulating layer 370, and the third insulating layer 370, which extends beyond the roof layer 360, may extend beyond the common electrode 270. An edge portion of the third insulating layer 370 does not overlap the common electrode 270 in a direction perpendicular to the substrate 110.

The shape and/or pattern of the second insulating layer 350 may be the same as the shape and/or pattern of the third insulating layer 370 in a plan view of the display device. An edge portion of the third insulating layer 370 may directly contact an edge portion of the second insulating layer 350.

In an embodiment, a boundary of the second insulating layer 350 may be formed at an inside of a boundary of the roof layer 360. The roof layer 360 may extend and/or protrude beyond the second insulating layer 350. Therefore, second insulating layer 350 may not interfere with a process of providing liquid crystal material into the microcavity 305.

In an embodiment, equipment used for patterning the roof layer 360 may be different from equipment used for patterning the third insulating layer 370. Even if a difference between the shape and/or pattern of the third insulating layer 370 and the shape and/or pattern of the roof layer 360 may be significant due to misalignment between the equipment, and even if the shape difference may cause a portion of the third insulating layer 370 that extends beyond the roof layer 360 to be sagged or broken, since the third insulating layer 370 is formed of an insulating material, the sagged or broken portion of the third insulating layer 370 would not cause short circuit issues.

In an embodiment, the third insulating layer 370 may not be formed. Accordingly, the potential misalignment issues discussed above may be prevented.

In an embodiment, the second insulating layer 350 and/or the common electrode 270 may be patterned by using the roof layer 360 as a mask. Therefore, there may be no substantial misalignment involving the second insulating layer 350, the common electrode 270, and/or the roof layer 360. Advantageously, structural integrity and/or robustness of the display device may be ensured.

In an embodiment, the common electrode 270 may not extend beyond the roof layer 360, as a result of over-etching the common electrode 270 material layer. Accordingly, the edge of the common electrode 270 may securely attach to the second insulating layer 350 and may not sag nor broken. Advantageously, conductive impurity and/or unwanted electrical connection, such as short circuit, may be prevented.

Figure 9:
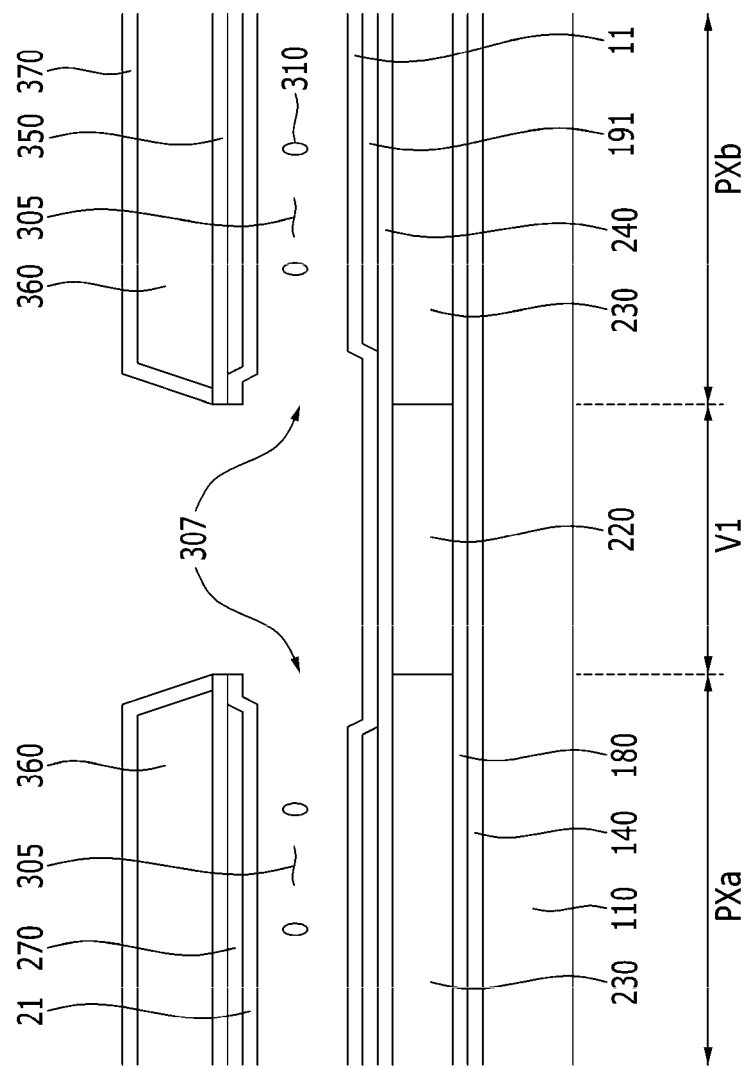

Referring to FIG. 9, the sacrificial layer 300 is fully removed by supplying at least one of a developer, a stripper solution, etc. to the sacrificial layer 300. Alternatively or additionally, the sacrificial layer 300 may be removed using an ashing process.

When the sacrificial layer 300 is removed, microcavities 305 may be formed at positions where the sacrificial layer 300 has been positioned.

The pixel electrode 191 and the common electrode 270 are spaced apart from each other with a microcavity 305 being positioned therebetween, and the pixel electrode 191 and the roof layer 360 are spaced apart from each other with the microcavity 305 being positioned therebetween. The common electrode 270 and the roof layer 360 may cover the upper surface and may at least partially cover sides of the microcavity 305.

The microcavity 305 is exposed at an opening formed as a result of removal of portions of the roof layer 360, the second insulating layer 350, and the common electrode 270. The opening is called an injection hole 307. An injection hole 307 may be formed along a first valley V1. In an embodiment, a first injection hole 307 may be formed at a first edge of the first subpixel area PXa, a second injection hole 307 may be formed at a first edge of the second subpixel area PXb. The first edge of the first subpixel area PXa and the first edge of the second subpixel area PXb may immediately neighbor each other and may be positioned between a second edge of the first subpixel area PXa and a second edge of the second subpixel area PXb. In an embodiment, the first edge of the first subpixel area PXa may be a lower edge of the first subpixel area PXa, and the first edge of the second subpixel area PXb may be an upper edge of the second subpixel area PXb. In an embodiment, an injection hole 307 may be formed along a second valley V2.

Subsequently, the roof layer 360 may be cured by applying heat to at least one of the roof layer 360 and the substrate 110. As a result, the shape of the space 305 may be maintained by the roof layer 360.

Subsequently, an aligning agent containing an alignment material may be provided on the substrate 110 using a spin coating method and/or an inkjet method. The aligning agent may be provided (e.g., injected) into the microcavity 305 through the injection hole 307. Subsequently, a curing process may be performed. As a result, a solution component may be evaporated, and an alignment material may remain on the inner wall of the microcavity 305 to form alignment layers 11 and 21.

The first alignment layer 11 may be formed on the pixel electrode 191, and the second alignment layer 21 may be formed on common electrode 270. The first alignment layer 11 and the second alignment layer 21 may overlap each other with the microcavity 305 being positioned therebetween and may be connected to each other at an edge of the pixel area PX.

In an embodiment, the alignment layers 11 and 21 may be configured to substantially align liquid crystal molecules in a vertical direction that is substantially perpendicular to the substrate 110 (i.e., perpendicular to a surface of the substrate 110 that overlaps the roof layer 360, except, for example, at positions where bead members 400 are located. In an embodiment, a process of irradiating UV light on the alignment layers 11 and 21 may be performed; as a result, the alignment layers 11 and 21 may be configured to substantially align liquid crystal molecules in a horizontal direction that is substantially parallel to the substrate 110.

Subsequently, liquid crystal material that includes liquid crystal molecules 310 is provided (e.g., dropped) on the substrate 110 using an inkjet method or a dispensing method. The liquid crystal material is provided (e.g., injected) into a microcavity 305 through a corresponding injection hole 307. In an embodiment, liquid crystal material may be provided (e.g., dropped) through injection holes 307 formed along only one first valley V1 of two immediately neighboring first valleys V1 (e.g., one that does not correspond to support members). For example, support members may be formed along two sides of each odd numbered first valley V1, and liquid crystal material is dropped in only the even-numbered first valleys V1 without being dropped in the odd-numbered first valleys V1. As another example, support members may be formed along two sides of each even numbered first valley V1, and liquid crystal material is dropped in only the odd-numbered first valleys V1 without being dropped in the even-numbered first valleys V1.

In an embodiment, liquid crystal material is provided to the injection holes 307 formed along the odd-numbered first valleys V1, and the liquid crystal material may enter the injection hole 307 through capillary action into the microcavity 305. As the liquid crystal material enters into the microcavity 305, the liquid crystal material may push the air in the microcavity 305 such that the air may be discharged through the injection hole 307 formed along the even-numbered first valley V1.

In an embodiment, liquid crystal material may be provided through all of the injection holes 307. In an embodiment, liquid crystal material may be provided through injection holes 307 formed along odd-numbered first valleys V1 and may be provided through injection holes 307 formed along even-numbered first valleys V1.

Figure 10:
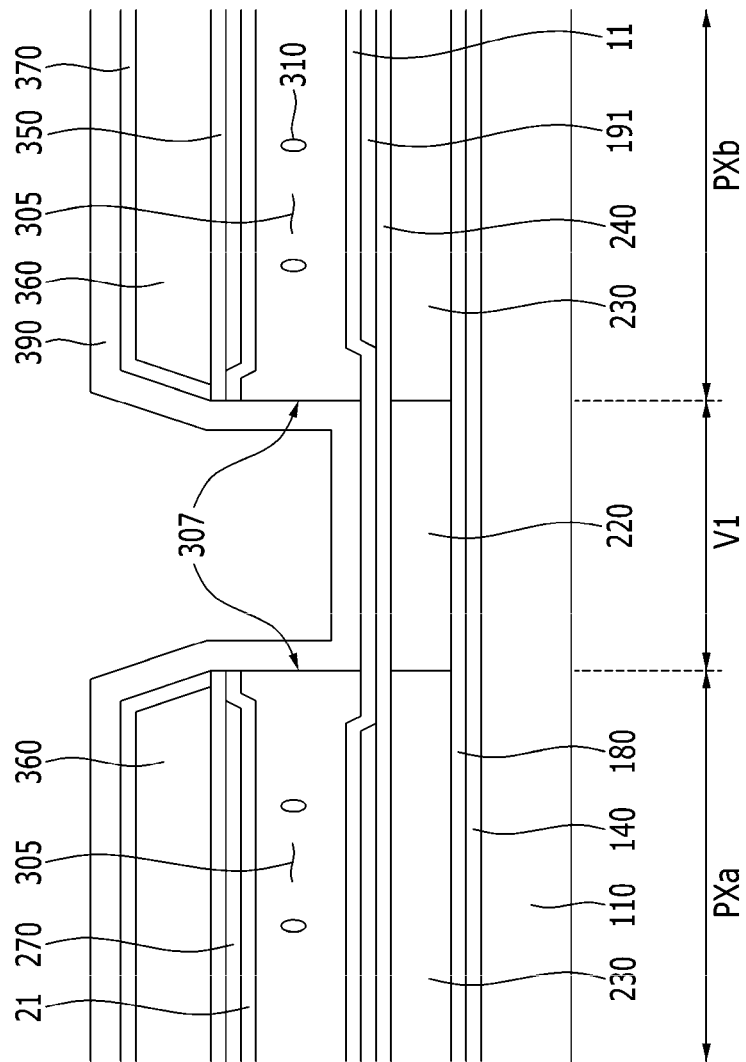

Referring to FIG. 10, an encapsulation layer 390 is formed by depositing a material that does not substantially (chemically) react with the liquid crystal molecules 310 on the third insulating layer 370. The encapsulation layer 390 is formed to cover the injection hole 307 for sealing the microcavity 305.

Subsequently, although not illustrated, a first polarizer may be attached onto the lower side of the substrate 110, and a second polarizer may be attached onto the encapsulation layer 390.

Figure 11:
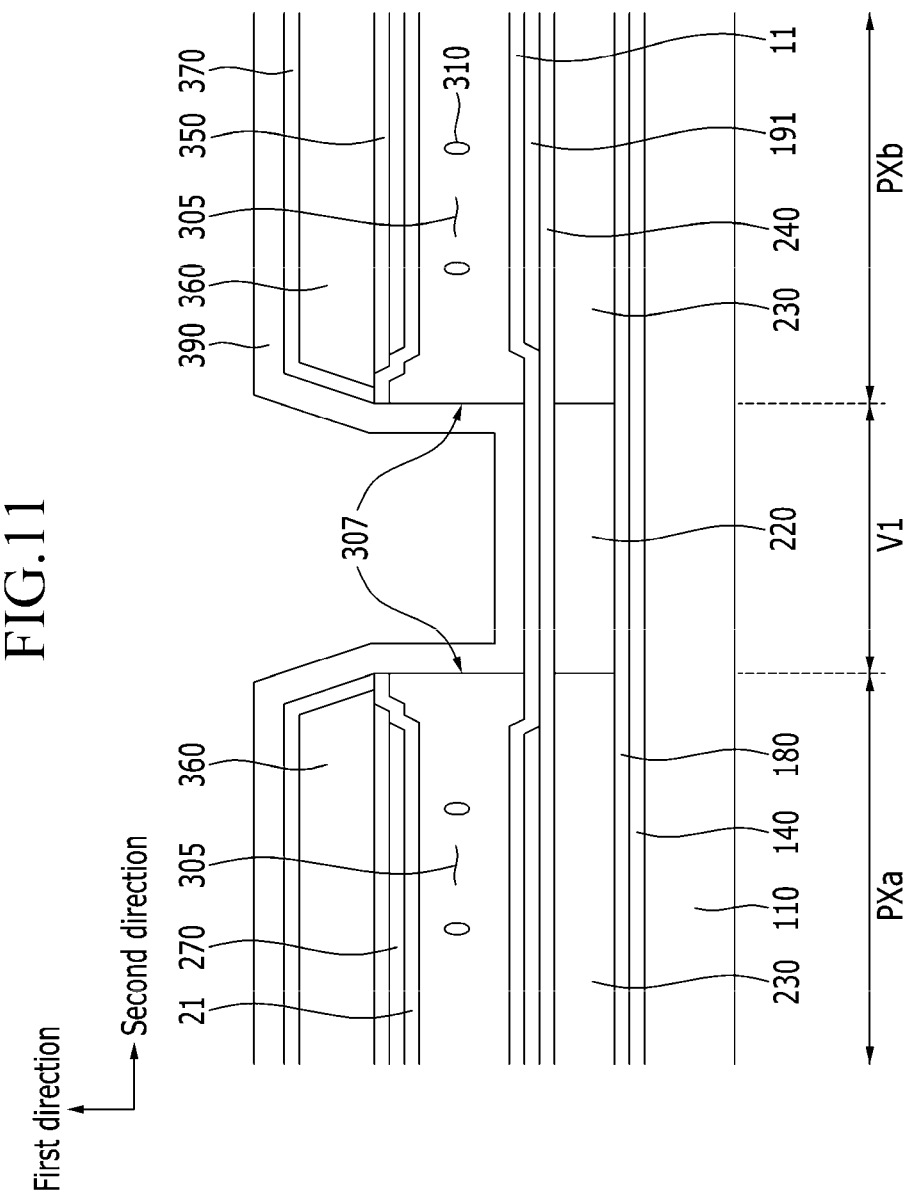
FIG. 11 is a cross-sectional view illustrating a part of a display device according to an embodiment of the present invention.
Figure 12:
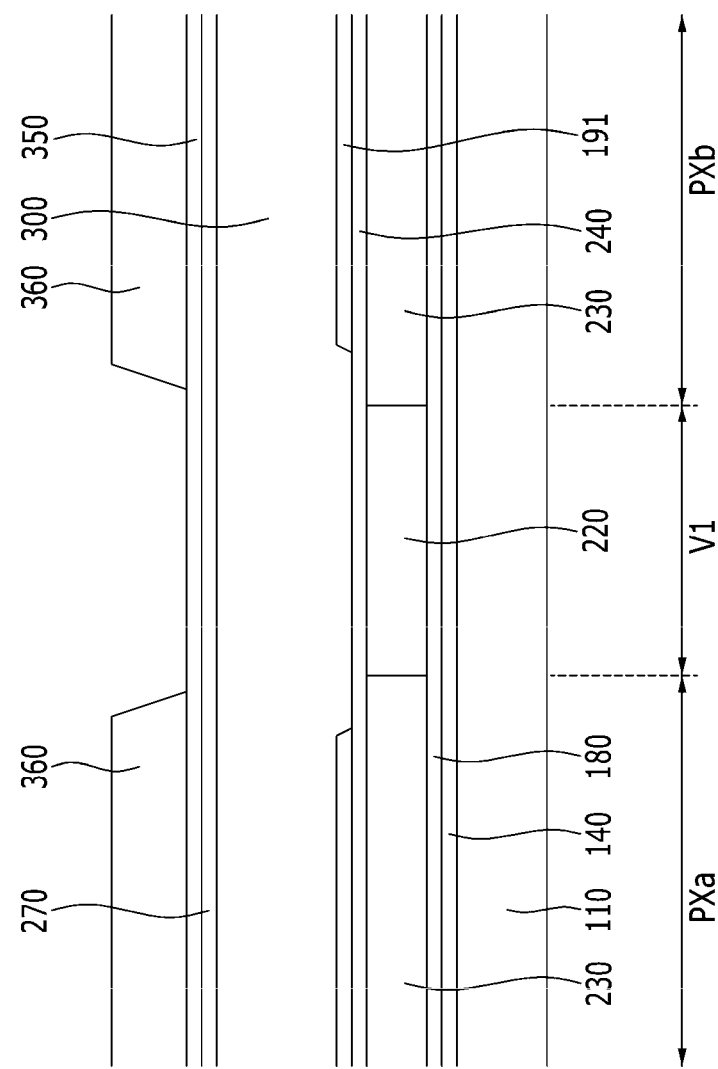
FIGS. 12 to 16 are process cross-sectional views illustrating a method for manufacturing a display device according to an embodiment of the present invention.

FIG. 11 is a cross-sectional view illustrating a display device according to an embodiment of the present invention. Some elements and/or features of the display device illustrated in FIG. 11 may be substantially identical to or analogous to some elements and/or features of the display device described with reference to FIGS. 1 to 10. In an embodiment, in the display device illustrated in FIG. 11, a third insulating layer 370 may extend beyond a second insulating layer 350 in a direction parallel to the substrate 110 and may not directly contact the second insulating layer 350.

In the display device illustrated in FIG. 11, a thin film transistor is formed on a substrate 110, a first insulating layer 240 is formed on the thin film transistor, and a pixel electrode 191 connected to the thin film transistor is formed on the first insulating layer 240. A common electrode 270 may overlap the pixel electrode 191 and may be spaced apart from the pixel electrode 191 with a microcavity 305 being positioned between the common electrode 270 and the pixel electrode 191. A second insulating layer 350 is formed on the common electrode 270, and a roof layer 360 is formed on the second insulating layer 350. Injection holes 307 are formed in at least one of the common electrode 270, the second insulating layer 350, and the roof layer 360 so as to allow liquid crystal material to be provided into the microcavity 305, and a liquid crystal layer that includes liquid crystal molecules 310 is formed in the microcavity 305. An encapsulation layer 390 is formed on the roof layer 360 to cover the injection hole 307 to seal the microcavity 305.

The common electrode 270, the second insulating layer 350, and the roof layer 360 may have similar shapes and/or patterns. The boundary and/shape of the common electrode 270, the boundary and/or shape of the second insulating layer 350, and the boundary and/or shape of the roof layer 360 may be different from each other near the injection hole 307.

Boundaries of the common electrode 270 and the second insulating layer 350 may be the same as (or overlap) a boundary of the roof layer 360 or may be positioned on the inner side of the boundary of the roof layer 360. The common electrode 270 and/or the second insulating layer 350 may be completely covered by the roof layer 360 and may not extend beyond the roof layer 360 in a direction parallel to the bottom surface of the substrate 110. An edge portion of the roof layer 360 may not to overlap the common electrode 270 and/or the second insulating layer 350 in a direction perpendicular to the bottom surface of the substrate 110. An edge of the common electrode 270 may have a reversely-tapered shape. An edge of the second insulating layer 350 may have a reversely-tapered shape.

A boundary of the common electrode 270 may be the same as (or overlap) a boundary of the second insulating layer 350 or may be positioned on the inner side of the boundary of the second insulating layer 350.

A third insulating layer 370 may be formed on the roof layer 360. The third insulating layer 370 may have a shape and/or pattern that may be similar to one or more of the shape and/or pattern of the common electrode 270, the shape and/or pattern of the second insulating layer 350, and the shape and/or pattern of the roof layer 360. A boundary of the third insulating layer 370 may be different from one or more boundaries of the common electrode 270, the second insulating layer 350, and the roof layer 360 near the injection hole 307.

Boundaries of the common electrode 270 and the second insulating layer 350 may be positioned on the inner side of the boundary of the third insulating layer 370.

FIGS. 12 to 16 are process cross-sectional views illustrating a method for manufacturing a display device described with reference to FIG. 11 according to an embodiment of the present invention. Some steps and/or features of the method for manufacturing the display device described with reference to FIG. 11 may be substantially identical to and/or analogous to some steps and/or features of a method described with reference to FIGS. 1 to 10.

In the method for manufacturing the display device illustrated in FIG. 11, thin film transistors Qh, Ql, and Qc are formed on a substrate 110, a first insulating layer 240 is formed on the thin film transistors Qh, Ql, and Qc, and pixel electrodes 191h and 191l connected to the thin film transistors Qh and Ql are formed on the first insulating layer 240. A sacrificial layer 300, a common electrode 270, and a second insulating layer 350 are sequentially formed on the pixel electrodes 191h and 191l.

Subsequently, a roof layer 360 is formed by coating and patterning an organic material on the pixel electrode 191. A portion of the organic material positioned at the first valley V1 may be removed. As a result, roof layers 360 may be formed along a plurality of pixel rows.

Figure 13:
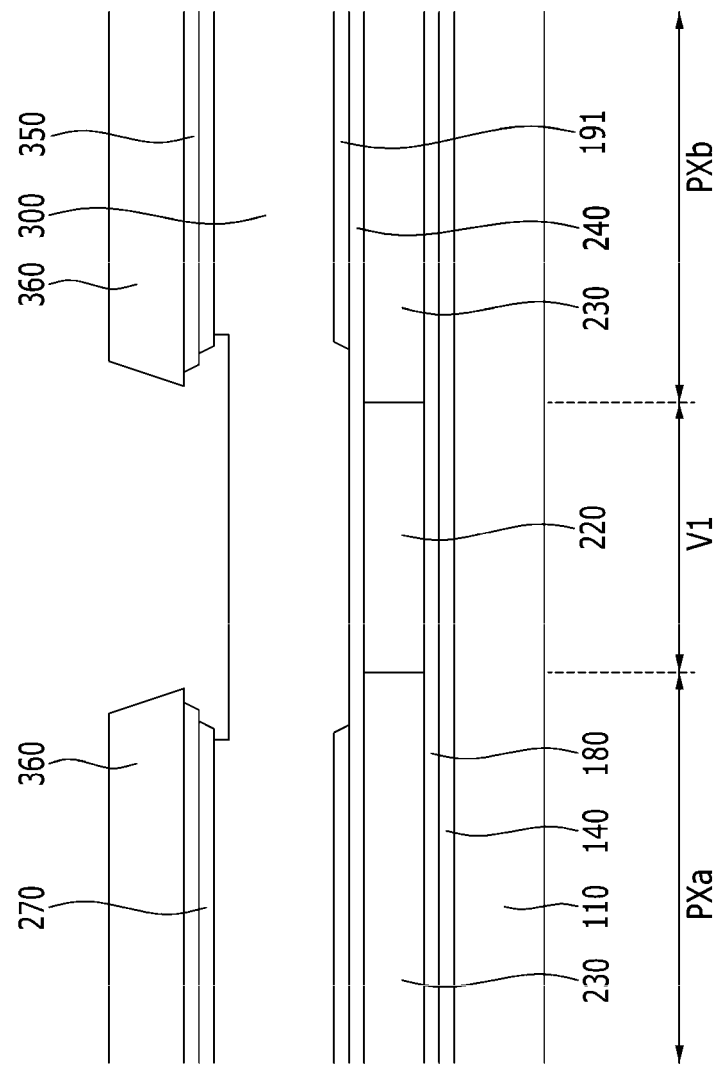

Referring to FIG. 13, the second insulating layer 350 and the common electrode 270 may be patterned using the roof layer 360 as a mask. A part of the sacrificial layer 300 is exposed by patterning the roof layer 360, the second insulation layer 350, and the common electrode 270, in order to form an injection hole 307.

Subsequently, the part of the sacrificial layer 300 positioned at the first valley V1 may be removed by ashing the sacrificial layer 300. In ashing the sacrificial layer 300, a part of the second insulating layer 350 and a part of the common electrode 270 are removed together in a region adjacent to the injection hole 307. As a result, boundaries, shapes and/or patterns of the common electrode 270 and the second insulating layer 350 may be the same as a boundary, shape, and/or pattern of the roof layer 360 or may be positioned on the inner side of the boundary, shape, and/or pattern of the roof layer 360. In an embodiment, an edge portion of the common electrode 270 and/or an edge portion of the second insulating layer 350 may have a reversely-tapered shape(s).

Figure 14:
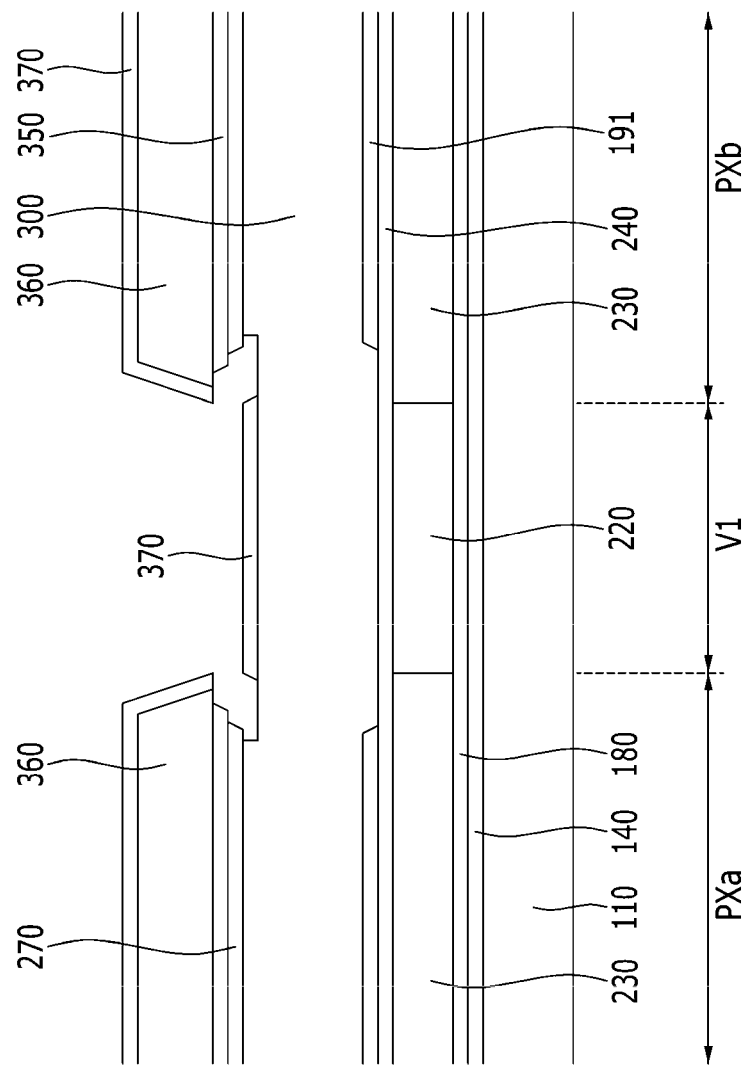

Referring to FIG. 14, a third insulating layer 370 material layer made of an inorganic insulating material, such as at least one of silicon nitride (SiNx), silicon oxide (SiOx), and silicon oxynitride (SiOxNy), is formed on the roof layer 360. Portions of the third insulating layer 370 material layer that overlap the first subpixel area PXa and the second subpixel area PXb are formed directly on the roof layer 360. The portions of the third insulating layer 370 material layer positioned directly on the roof layer 360 may cover the upper surface and one or more side surface of a roof layer 360 to protect the roof layer 360. A portion of the third insulating layer 370 material layer positioned at the first valley V1 is formed directly on the sacrificial layer 300.

Each portion of the third insulating layer 370 material layer positioned directly on the roof layer 360 may be disconnected from the portion of the third insulating layer 370 material layer positioned directly on the sacrificial layer 300. The edges of the second insulating layer 350 and the common electrode 270 that are positioned below the roof layer 360 are have a reversely-tapered shape, and as a result, the third insulating layer 370 is not supported by the edges of the second insulating layer 350 and the common electrode 270.

Figure 15:
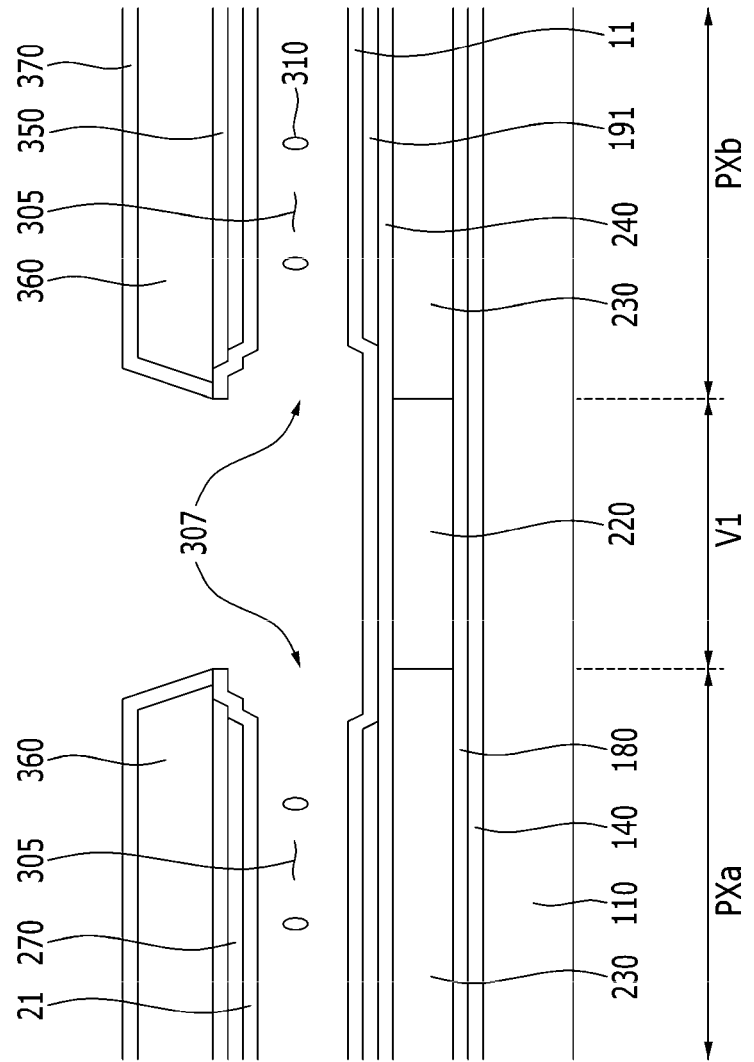

Referring to FIG. 15, the sacrificial layer 300 is fully removed by supplying at least one of a developer, a stripper solution, etc. through spaces between disconnected portions of the third insulating layer 370 material layer and/or is removed by performing an ashing process.

Figure 16:
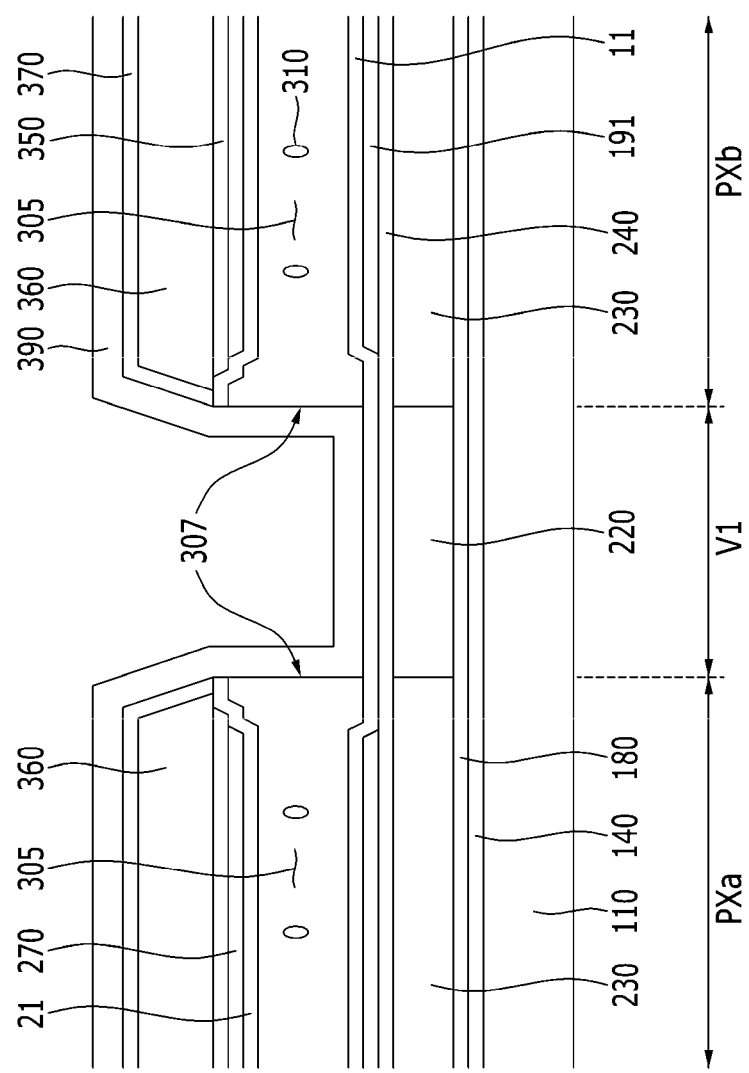

In the process of removing the sacrificial layer 300, the portion of the third insulating layer 370 material layer directly disposed on the sacrificial layer 300 is lifted-off and is removed. The remaining portions of the third insulating layer 370 material layer that attach to the roof layers 360 may form the third insulating layer 370. Referring to FIG. 16, an encapsulation layer 390 is formed on the third insulating layer 370 to cover the injection hole 307, thereby sealing the microcavity 305.

According to embodiments of the invention, the portion of the third insulating layer 370 material layer attached to the sacrificial layer is lifted-off in the removing process of the sacrificial layer 300. Accordingly, the third insulating layer 370 may be formed without requiring additional equipment. Advantageously, potential misalignment between different sets of equipment may be prevented.

According to embodiments of the invention, the second insulating layer 350 and common electrode 270 may be patterned using the roof layer 360 as a mask. Therefore, potential misalignment issues may be prevented in forming the second insulating layer 350 and the common electrode 270.

According to embodiments of the invention, in the process of ashing the sacrificial layer 300, edge portions of the second insulating layer 350 and the common electrode 270 may be partially removed simultaneously. As a result, the common electrode 270 may not extend beyond the roof layer 360 in a direction parallel to the bottom surface of the substrate 110. Accordingly, the edge of the common electrode 270 may securely attach to the roof layer 360 and may not sag nor broken. Advantageously, conductive impurity and/or unwanted electrical connection may be prevented.

According to embodiments of the invention, the enclosure layer 390 (alone or in combination with other elements) may provide sufficient structural robustness, such that the display device may not need a second substrate. Advantageously, the thickness, the weight, the manufacturing cost, and/or the manufacturing time of the display device may be minimized.

While this invention has been described in connection with what is presently considered to be practical embodiments, it is to be understood that the invention is not limited to the disclosed embodiments. This invention is intended to cover various modifications and equivalent arrangements included within the spirit and scope of the appended claims.

What is claimed is:

1. A method for manufacture manufacturing a display device, the method comprising:
    forming a first subpixel electrode on a substrate;
    forming a sacrificial layer on the first subpixel electrode;
    forming a common electrode material layer on the sacrificial layer;
    forming a first insulating material layer on the common electrode material layer;
    forming a first roof layer and a second roof layer on the first insulating material layer, the first roof layer and the second roof layer including an organic material and being spaced from each other;
    etching the first insulating material layer using the first roof layer as a mask to form a first insulating layer;
    etching the common electrode material layer using the first roof layer as a shield to form a first common electrode member;
    forming a second insulating material layer on the first roof layer after the etching of the common electrode material layer;
    removing the sacrificial layer to form a first cavity between the first subpixel electrode and the first common electrode member;
    providing a first liquid crystal set into the first cavity through a space between the first roof layer and the second roof layer; and
    forming an encapsulation layer to confine the first liquid crystal set,
    wherein a first portion of the second insulating material layer is disposed on the first roof layer and a second portion of the second insulating material layer is disposed on the sacrificial layer, and
    wherein the second portion of the second insulating material layer is removed when performing the removing the sacrificial layer.

2. The method of claim 1, wherein the etching the first insulating material layer includes dry-etching the first insulating material layer, and wherein the etching the common electrode material includes wet-etching the common electrode material.

3. The method of claim 1, wherein the first common electrode member overlaps the first roof layer in a first direction without extending beyond the first roof layer in a second direction, the first direction being perpendicular to a surface of the substrate, the second direction being parallel to the surface of the substrate.

4. The method of claim 1, wherein a first surface of the first common electrode member is positioned between the first roof layer and a second surface of the first common electrode member, and wherein the first surface of the first common electrode member is larger than the second surface of the first common electrode member.

5. The method of claim 1, wherein the second insulating material layer is formed before the forming of the encapsulation layer.

6. The method of claim 1, wherein the second insulating material layer directly contacts two surfaces of the first roof layer and directly contacts a portion of the first insulating layer.

7. A method for manufacturing a display device, the method comprising:
- forming a first subpixel electrode on a substrate;
- forming a sacrificial layer on the first subpixel electrode;
- forming a common electrode material layer on the sacrificial layer;
- forming a first insulating material layer on the common electrode material layer;
- forming a first roof layer and a second roof layer on the first insulating material layer, the first roof layer and the second roof layer including an organic material and being spaced from each other;
- etching the first insulating material layer using the first roof layer as a mask to form a first insulating layer;
- etching the common electrode material layer using the first roof layer as a shield to form a first common electrode member;
- forming a second insulating material layer on the first roof layer after the etching of the common electrode material layer;
- removing the sacrificial layer to form a first cavity between the first subpixel electrode and the first common electrode member;
- providing a first liquid crystal set into the first cavity through a space between the first roof layer and the second roof layer; and
- forming an encapsulation layer to confine the first liquid crystal set, wherein the removing the sacrificial layer includes ashing the sacrificial layer, and wherein at least one of an edge portion of the first common electrode member and an edge portion of the first insulating layer is removed during the ashing the sacrificial layer.

8. The method of claim 7, wherein the second insulating material layer is formed after the ashing of the sacrificial layer.

* * * * *